United States Patent [19]
Cunniff et al.

[11] Patent Number: 5,936,632
[45] Date of Patent: Aug. 10, 1999

[54] METHOD FOR FAST DOWNLOADING OF TEXTURES TO ACCELERATED GRAPHICS HARDWARE AND THE ELIMINATION OF EXTRA SOFTWARE COPIES OF TEXELS

[75] Inventors: Ross Cunniff; Bradley L. Saunders, both of Fort Collins, Colo.

[73] Assignee: Hewlett-Packard Co., Palo Alto, Calif.

[21] Appl. No.: 08/690,426

[22] Filed: Jul. 26, 1996

[51] Int. Cl.[6] ........................................... G06F 15/00
[52] U.S. Cl. ........................................... 345/430; 345/433
[58] Field of Search ................................... 345/430, 433

[56] References Cited

U.S. PATENT DOCUMENTS 5,404,428  4/1995  Wu ........................................... 345/433
5,745,118  4/1998  Alcorn et al. ........................... 345/430

Primary Examiner—Mark K. Zimmerman
Assistant Examiner—Chanté Harrison

[57] ABSTRACT

The invention provides a method for the fast downloading of textures to graphics hardware for use in computer graphics. By loading the textures directly into hardware, and by making that the only copy of the texture which is downloaded, it is possible to save the time and memory space which have heretofore been required to make at least two additional copies of the texture. Instead, bookkeeping entries are made which tell the graphics API and the applications software that the texture is already available in the graphics hardware.

5 Claims, 6 Drawing Sheets

METHOD FOR FAST DOWNLOADING OF TEXTURES TO ACCELERATED GRAPHICS HARDWARE AND THE ELIMINATION OF EXTRA SOFTWARE COPIES OF TEXELS

BACKGROUND OF THE INVENTION

The present invention relates to a method for fast downloading of textures to accelerated graphics hardware and the elimination of extra software copies of texels. In particular, the invention relates to software memory management of texture maps of a texture mapping computer graphics system and, more particularly, to a new approach which considerably speeds up the downloading of textures when a Texture Interrupt Management ("TIM") daemon based virtual memory management system is used to provide a hardware device local cache memory system for storing texture mapping data.

Current implementations of texture mapping, as described in greater detail in U.S. patent application Ser. No. 08/486,447, filed Jun. 8, 1995, entitled TEXEL CACHE INTERRUPT DAEMON FOR VIRTUAL MEMORY MANAGEMENT OF TEXTURE MAPS, by Ethan W. Gannett, which is assigned to the present assignee, the contents of which are incorporated herein by reference, store a copy of the user's texture in software to provide a mechanism for texture inquiry and to allow cacheing of texels in hardware when there is not enough memory to fit all of the texels into the hardware at one time.

In typical computer graphics systems, an object to be represented on the display screen is broken down into a plurality of graphics primitives. Primitives are basic components of a graphics picture and may include points, lines, vectors, and polygons, such as triangles. Typically, a hardware/software scheme is implemented to render, or draw, on the two-dimensional display screen, the graphics primitives that represent the view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the x,y,z coordinates of its vertices, as well as the R,G,B color values of each vertex. Rendering hardware interpolates the primitive data to compute the display screen pixels that are turned on to represent each primitive, and the R,G,B values for each pixel.

Early graphics systems failed to display images in a sufficiently realistic manner to represent, or model, complex three-dimensional objects. The images displayed by such systems exhibited extremely smooth surfaces absent textures, bumps, scratches, shadows, or other surface details present in the object being modeled.

As a result, methods were developed to display images with improved surface detail. Texture mapping is one such method that involves mapping a source image, herein referred to as a "texture", onto a surface of a three-dimensional object, and thereafter mapping the textured three-dimensional object to the two-dimensional graphics display screen to display the resulting image. Surface detail attributes which are commonly texture mapped include color, specular reflection, vector perturbation, specularity, transparency, shadows, surface irregularities and grading.

Texture mapping involves applying one or more point texture elements ("texels") to each point element ("pixel") of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. For each pixel, the corresponding texel or texels that map to it are accessed from the texture map, and incorporated into the final R,G,B values generated for the pixel to represent the textured object on the display screen.

It should be understood that each pixel in an object primitive may not map in a one-to-one correspondence with a single texel in the texture map for every view of the object. For example, the closer the object is to the view port represented on the display screen, the larger the object will appear. As the object appears larger on the display screen, the representation of the texture becomes more detailed. Thus, when the object consumes a fairly large portion of the display screen, a large number of pixels are used to represent the object on the display screen, and each pixel that represents the object may map in a one-to-one correspondence with a single texel in the texture map, or a single texel may map to multiple pixels. However, when the object takes up a relatively small portion of the display screen, a much smaller number of pixels is used to represent the object, resulting in the texture being represented with less detail, so that each pixel may map to multiple texels. In addition, each pixel may map into multiple texels when a texture is mapped to a small portion of an object. Resultant texel data is calculated for each pixel that maps to more than one texel. As it is common for a pixel to map to multiple texels, resultant texel data for a pixel typically represents an average of the texels that map to that pixel.

Texture mapping hardware systems typically include a local memory that stores data representing a texture associated with the object being rendered. As discussed above, a pixel may map to multiple texels. If it were necessary for the texture mapping hardware to read a large number of texels that map to a pixel from the local memory to generate an average value, then a large number of memory reads and the averaging of many texel values would be required, which would be time consuming and would degrade system performance.

To overcome this problem, a scheme has been developed that involves the creation of a series of maps, called "MIP" (meaning "multum in parvo"—many things in a small place) maps, for each texture, and storing the MIP maps of the texture associated with the object being rendered in the local memory of the texture mapping hardware. A MIP map for a texture includes a base map that corresponds directly to the texture map, as well as a series of filtered maps, wherein each successive map is reduced in size by a factor of two in each of the two texture map dimensions. An illustrative example of a set of MIP maps is shown in FIG. 1. The MIP maps include a base map ("Level 0") 100 that is eight-by-eight texels in size, as well as a series of maps 102, 104 and 108 that respectively represent Level 1, which is four-by-four texels; Level 2, which is two-by-two texels; and Level 3, which is one texel in size.

The Level 1, four-by-four map, 102 is generated by box filtering (decimating) the base map 100, such that each texel in the Level 1 map 102 corresponds to an average of four texels from the Level 0 base map 100. For example, the texel 110 in Level 1 map 102 equals the average of the texels 112–115 in Level 0 (base) map 100. Similarly, texels 118 and 120 in Level 1 map 102 equal the averages of texels 121–124 and 125–128 in Level 0 (base) map 100, respectively. The two-by-two, Level 2, map 104 is similarly generated by box filtering Level 1 map 102, such that texel 130 in Level 2 map 104 equals the average of texels 110 and 118–120 in Level 1 map 102. The single texel in Level 3 map 108 is generated by averaging the four texels in Level 2 map 104.

Conventional graphics systems generally download, from the main memory of the host computer to the local memory of the texture mapping hardware, the complete series of MIP maps for any texture that is to be used with the primitives to be rendered on the display screen. Thus, the texture mapping hardware can access texture data from any of the series of MIP maps. The determination of which map to access to provide the texel data for any particular pixel is based upon the number of texels to which the pixel maps. For example, if the pixel maps in one-to-one correspondence with a single texel in the texture map, then the base map 100 is accessed. However, if the pixel maps to four, sixteen or sixty-four texels, then the maps 102, 104 and 108 are respectively accessed, because those maps respectively store texel data representing an average of four, sixteen and sixty-four texels in the texture map.

Furthermore, some texture mapping systems are pipelined so that various operations are performed simultaneously on different object primitives. However, a series of MIP maps for a texture can be large. Most systems employ a local memory that is capable of storing only one such large series of MIP maps at a time. Thus, when there is a switch in the texture used in rendering primitives, the system must download a new series of MIP maps. Typically, the data path used to load the new texture data into the local memory in the texture mapping hardware includes passing through the system's primitive rendering pipeline. Therefore, when a new texture is to be mapped, the primitive rendering pipeline must be allowed to empty out before the new series of MIP maps can be downloaded. Once the series of MIP maps is downloaded, the pipeline must again be filled. The necessity of flushing the primitive rendering pipeline each time a new texture is required reduces the system's bandwidth.

FIG. 2 is a part hardware, part hierarchical software block diagram of a conventional computer graphics system showing the layers of software that run on the processor of the system host computer as well as the hardware device with which the host computer communicates to render the texture mapped images. The system memory of the host computer may store multiple user interactive processes PR1, PR2, . . . , PRN that can run on the system processor, as shown in FIG. 2. Each process, PRi, is a high level computer graphics software program or application such as a database, a CAD/CAM application, an architectural design application, a civil engineering application, a word processing package, or the like.

Within a particular process, a user can create multiple contexts. Each context created within a process may include a different view of the same image. For example, in an architectural engineering design application process, a user may create different views of the same structure, such as a building. Each context may require texture mapping to render the image. In this example, texture maps may be required to render the floors, walls, ceilings and other surface attributes of the building. Thus, the user provides the texture map or maps to render the image of that context. Because multiple contexts created within the same process typically include different views of the same image, the contexts within a process commonly require the same texture or textures.

When a context is created by a user, the user issues a command recognizable by the high level process programming language to draw that image. If the image requires a texture map, then a command is entered indicating that a texture map is required, and the texture map is then provided by the user from an external input device, floppy disk, or the like. The process, or high level programming language, then translates that command to a lower level software command and copies the texture entered by the user. In prior art systems, such as that shown in FIG. 2, each context created within a single process requires its own copy of that texture. Each context stores its copy of the texture within a dedicated area of system memory on the host computer. Thus, when multiple contexts within a process require use of the same texture, multiple copies of that texture are stored within the system memory, one copy corresponding to each context.

The user-entered command to draw an image using a particular texture, once translated by the process, is communicated from the process to an underlying graphics application programmer interface ("API"). As shown in FIG. 2, a unique graphics API communicates with each process of the system. Each graphics API is an underlying lower level software language, which operates on the processor of the host computer, to translate each high level graphics command received from the corresponding process to a lower level software code command. The graphics API also stores a copy of each texture required to render the image in its own dedicated location of the system memory. The graphics API additionally breaks down the image to be rendered into graphics components such as quadrilaterals or polygons. Such information is then provided to a corresponding hardware driver.

A unique hardware driver communicates with each graphics API. Each hardware driver is another underlying lower level graphics software language that translates each low level graphics command received from the API to hardware commands recognizable by the graphics hardware device to which the host computer is connected. These commands are then communicated from the hardware driver to the hardware device which, in response, renders the texture mapped image on a display screen connected to the hardware device. As shown in FIG. 2, a unique instance of a hardware driver HWD1, HWD2, . . . , HWDN communicates with each graphics API, API1, API2, . . . , APIN.

In the example shown in FIG. 2, all of the hardware drivers are connected to a single graphics hardware device 150. As will be understood by those skilled in the art, however, the host computer may be connected to multiple different graphics hardware devices, with a different hardware driver communicating with each hardware device.

When a graphics API provides a low level software command to render a texture mapped polygon using a particular texture that also is provided, the graphics hardware driver translates that low level command into hardware commands recognizable by the hardware device 150. The graphics hardware driver then provides the commands to render the polygon to the hardware device 150 by writing to appropriate registers and input buffers within the hardware device. Additionally, the graphics hardware driver provides the texture data for that particular polygon to the local memory 155 of the hardware device 150 where it is temporarily stored during rendering of that polygon. As is described herein, prior art computer graphics systems download the entire series of MIP maps for a single texture from the graphics hardware driver to the local memory of the hardware device each time that texture is required to render an image or component of the image.

With conventional systems, such as the one shown in FIG. 2, multiple copies of a single texture are stored in different locations of the system software memory of the host computer. For example, if context 1A and context 1B of process PR1 require the same texture to render different views of a particular image, then the user provides a first copy of that texture when it is initially defined and introduced to the process. The graphics API1 makes a copy of the texture for Context 1A (the second copy) and another copy of that texture for Context 1B (the third copy) and stores them in memory shared between the API and the hardware. Thus, three unique copies of the same texture are stored in different locations of the system software memory to render two views of the same image using that same texture. Additionally, fourth and fifth copies of the texture are provided to the hardware device and stored in the local memory thereof.

As will be recognized, a series of texture MIP maps can require a large amount of system software memory for storage. For example, a series of MIP maps for a texture having a texture base map of 1024×1024 texels requires more than five megabytes of system software memory to store one copy of the MIP mapped texture. Thus, the multiple stored copies of the MIP mapped texture uses a significant amount of system software memory.

While system software memory may be able to store up to a few gigabytes of software data, typical dedicated local hardware texture memory of a texture hardware device can store much less data. Such local texture hardware memory typically range from four megabytes to sixteen megabytes. In many texture mapping applications, therefore, the amount of system memory consumed by textures far exceeds that of the local hardware texture memory. While the system memory typically stores multiple MIP mapped textures for use with multiple contexts of a process, the local hardware device memory may store only one texture of a limited size at any one time. Therefore, proper management of the local texture memory of the hardware device is critical to achieve maximum performance of the system.

In addition to the large consumption of system software memory due to the storage of multiple copies of textures, system bandwidth generally suffers with conventional local hardware texture memory management schemes. Conventional local hardware memory management schemes repeatedly replace entire series of texture MIP maps within the local hardware memory. The series of MIP maps for a texture is replaced in the local memory each time that texture is needed to render a polygon. Such schemes both fail to consider the history of the use of that texture and to predict future use of that texture. By repeatedly downloading the entire series of the same texture from the system memory into the local hardware texture memory, system bandwidth is negatively affected.

Because conventional texture hardware memory replacement algorithms download entire texture MIP map series, each texture MIP map series cannot exceed the physical storage capacity limits of the local hardware texture memory. Therefore, the user of the graphics process that is connected to the particular hardware device, is required to know the capacity of the local texture memory so that textures greater than that capacity will not be used. While many applications (processes) can operate with several different underlying hardware devices, each with unique local texture memory constraints, the burden falls on the user to have knowledge of such constraints and create images in a device-dependent manner.

As indicated above, it is possible for a large number of software copies to be created for any given texture. Yet, in many cases there is never a need for all of those software copies. In these cases, the user never inquires the texture back, and during the life of the texture there is always room to store it in the texel cache. Prior solutions to this problem have focused on reducing the number of operations performed on the texture map before copying it in to graphics core memory, but have not eliminated the various software copies, as it was thought that the software copies were required since the graphics core can not determine future functions that might be performed on the texture (e.g., inquiry of the texture).

Accordingly, in U.S. patent application Ser. No. 08/486,447 filed Jun. 8, 1995 entitled TEXEL CACHE INTERRUPT DAEMON FOR VIRTUAL MEMORY MANAGEMENT OF TEXTURE MAPS, by Ethan W. Gannett, referenced above, a TIM is described which provides for the shared storing of textures among the manager (the "TIM"), the hardware driver, and the corresponding graphics API within the system memory. The manager also provides for shared storing of textures among multiple contexts of a single process. The management scheme described by Gannett provides tremendous bandwidth savings and system software memory space savings in contrast with the prior art. The system described by Gannett additionally enables the user of the high level graphics processes to create images in a device independent manner, without knowledge of the storage capacity limits of the local memories of the underlying hardware devices.

In one embodiment of the Gannett invention, shown in the block diagram of FIG. 3 in which same reference characters are used to reference identical elements to those of FIG. 2. Like the (pre-Gannett) prior art embodiment of FIG. 2, the system includes multiple user interactive processes PR1, PR2, . . . PRN that run on the system processor. Within each process, the user can create multiple contexts which require the same texture maps. The system also includes an underlying graphics API and graphics hardware driver for each process.

The Gannett invention related to a texture interrupt managing ("TIM") daemon 160 that is an independent, stand alone software process that runs on the processor of the host computer, unbeknownst to the user. The TIM 160 of the Gannett invention communicated with each of the graphics hardware drivers over a distinct socket. As will be understood by those skilled in the art, a socket is a software communications path over which two software programs can communicate. The TIM also communicated with the hardware device 150 over a bus 162.

The TIM of the Gannett invention can run on conventional processors of computer graphics system host computers known as computer graphics workstations. An example of such a workstation would be the Hewlett-Packard 9000 series J200.

TIM 160 manages the storing of texture data within the local memory 155 of the hardware device 150, and the TIM included a device independent portion that handled the software texture memory management and socketed communications with the graphics hardware drivers and a device dependent portion that writes to and reads from the hardware device over bus 162.

In one embodiment of the Gannett invention, the local memory of the hardware device is arranged as a cache memory in which portions of textures are stored in the local memory of the hardware device at any one time. The device independent portions of the TIM track the usage of the portions of texture data stored in the cache and monitor the priorities of the textures to predict future usage of those portions. A cache miss in the hardware occurs when texture data is needed by the hardware device to render an image that is not currently stored in the cache. When a cache miss occurs, the TIM determines which block of texture data within the cache to replace by considering which block or blocks of texture data within the cache were used least recently and which textures have the lowest priority.

In one embodiment of the Gannett invention, the TIM includes a shared memory location within the system memory in which a large texture or texture portion is stored and is shared between the graphics API, graphics hardware driver and TIM, for a particular process. Each of the graphics API, the graphics hardware driver (for a particular process), and the TIM 160 includes a pointer to a location within the system shared memory area to access the stored texture copy. In addition, the TIM provides a memory management scheme such that all of the contexts created within a single process share the same copy of any texture needed for those contexts. For certain applications, therefore, the TIM of the Gannett invention provided tremendous savings of system software memory space.

With respect to the example described above with reference to FIG. 2, in which context 1A and context 1B of process PR1 require the same texture to render different views of a particular image, if the texture is large, then the TIM of the Gannett invention provided tremendous system memory space savings. By contrast with the prior art (pre-Gannett) system described, a single copy of the texture may be stored that would be shared between context 1A and context 1B. Additionally, if the texture was large enough to warrant it being stored in the shared memory location, then only one other copy of the texture would be stored in the system shared memory location and would be shared between the TIM, the graphics API1, and the graphics hardware driver HWD1. Thus, in this example, only three unique copies of the same texture would be stored in different locations of the system software memory to render two views of the same image using that same texture. One copy would be the user copy, one copy would be shared between the two contexts of the process PR1 and one copy would be shared between the graphics API, the graphics hardware driver and TIM. In the prior art (pre-Gannett) system of FIG. 2, described above, five copies of that same texture would have to be stored in the system software memory. Therefore, with the TIM of the Gannett invention, two less copies of the texture are required to be stored in the system software memory which, for a large texture, results in great memory space savings.

On the other hand, using the device of the present invention, as will be explained hereinafter, requires that only a single copy of the texture exist, and that it be maintained in the graphics hardware.

Using the Gannett invention, it was necessary to perform several steps in order to draw a textured triangle 10. As shown in FIG. 4, first, the application program specified a texture, using an API call 12. The API library verified that the API call was valid 14, and then the API copied the texture into a library-private buffer 16, thereby creating the first copy of the texture.

Next, the texture daemon ("TIM") copied the texture into the daemon's private buffer (possibly reformatted to meet daemon requirements), creating the second copy of the texture 18.

An application program draws a triangle 20 using the texture by having the graphics hardware ask the texture daemon to provide portions of the texture required to draw the triangle 22. Thus, the applications program must have the texture daemon download the required portions of the texture, thereby making the third copy of the texture 24.

Similarly, pursuant to the Gannett invention, an additional copy of the texture is maintained to handle the inquiry by the application of the current value of the texture, or to handle the removal of the texture from the graphics hardware when a new texture is required.

SUMMARY OF THE INVENTION

In accordance with the preferred embodiment of the invention, making the software copy of the texture is deferred until it is absolutely needed or the texture is discarded by the user.

In addition, the present invention generalizes texture download to always use this mechanism, greatly simplifying software architecture and increasing performance in cases such as frame buffer copies to the texture cache—again, no software copy is needed unless it is asked for.

The fast downloading of textures to accelerated graphics hardware, called simply "fast download", provides a mechanism to download textures directly in to hardware texel cache deferring, or possibly completely eliminating, the need for a software copy of the texels. This dramatically increases the performance of downloading textures to hardware, which also greatly increases the performance of applications that have dynamically changing textures.

DETAILED DESCRIPTION OF THE PREFERRED EMBODIMENT OF THE INVENTION

In order to avoid the numerous copies of textures, together with the time it took to make such copies, as well as the large amount of memory resources which such copies occupied, the present invention provides a means for placing textures into the graphics hardware directly from the user's buffer. The use of the present invention increases texture download speed as well as rendering performance of applications that have dynamically changing textures. It allows users of texture mapping to efficiently download their textures directly into the hardware texel cache.

The invention makes use of a mechanism to keep track of textures that are stored only in hardware, yet it maintains the ability to provide a copy of the texture in software should it be needed. Thus, if a user inquires the texture back, or if the graphics context changes, the texture can be provided back to the user.

As set forth above, current implementations of texture mapping store a copy of the user's texture in software to provide a mechanism for texture inquiry and to allow cacheing of texels in hardware when there is not enough memory to fit all of the texels in the graphics hardware at one time. In many cases, that software copy of the texture is never needed. In these cases, the user never inquires the texture back, and during the life of the texture there is always room to store it in the texel cache. The present invention optimizes this case, by deferring the software copy of the texture until it is absolutely needed or until the texture is discarded by the user.

Additionally, the present invention generalizes texture download to always use this mechanism, greatly simplifying software architecture and increasing performance in cases such as frame buffer copies to the texture cache—again, no software copy is needed unless it is asked for.

Figure 1:
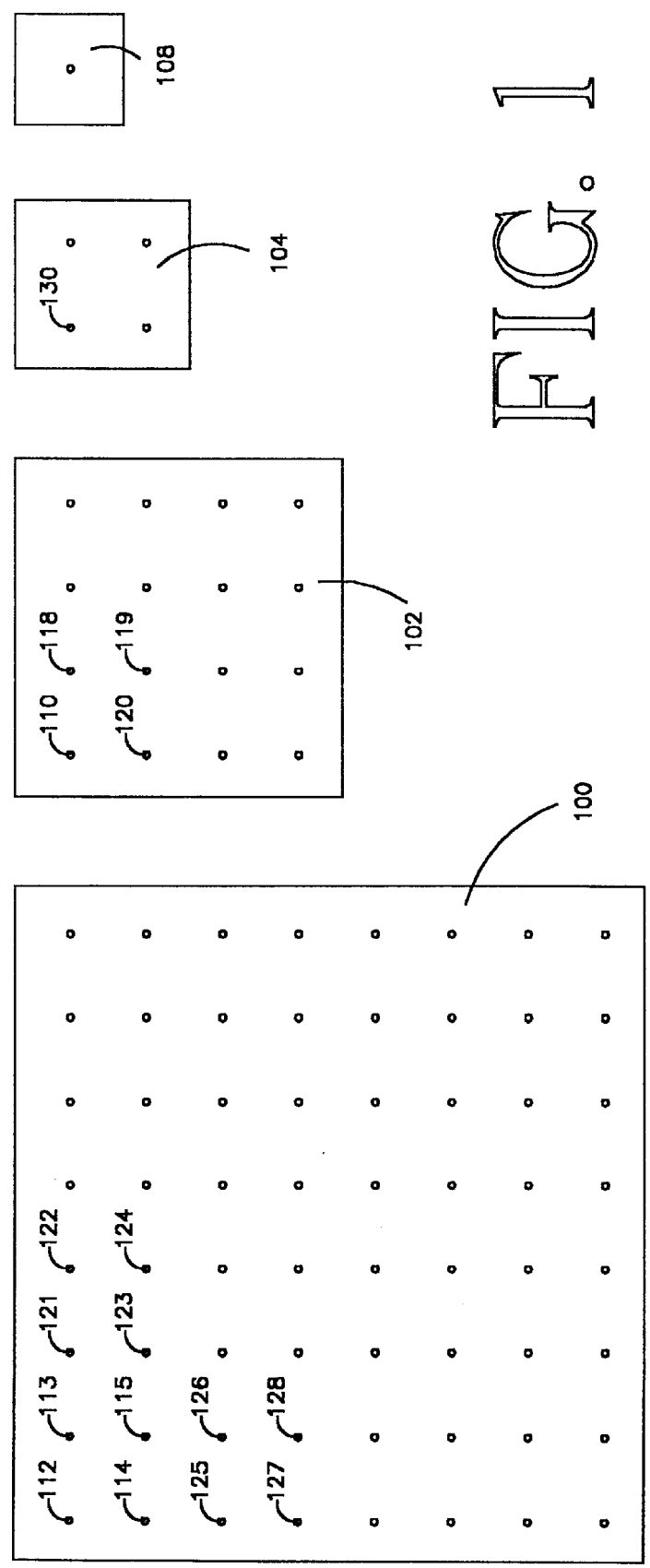
FIG. 1 illustrates is a graphical illustration of a set of texture MIP maps.
Figure 2:
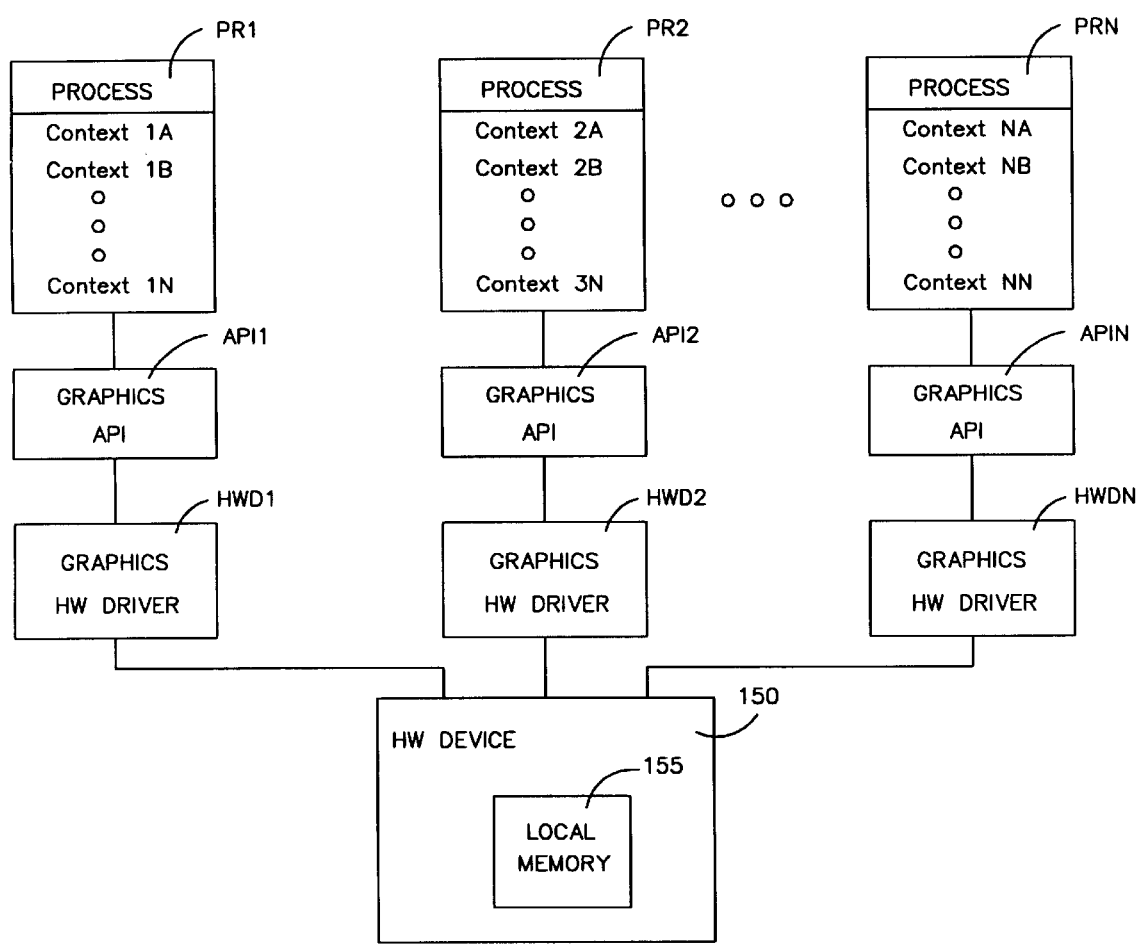
FIG. 2 is a part hardware, part hierarchical software block diagram of a prior art computer graphics system.
Figure 3:
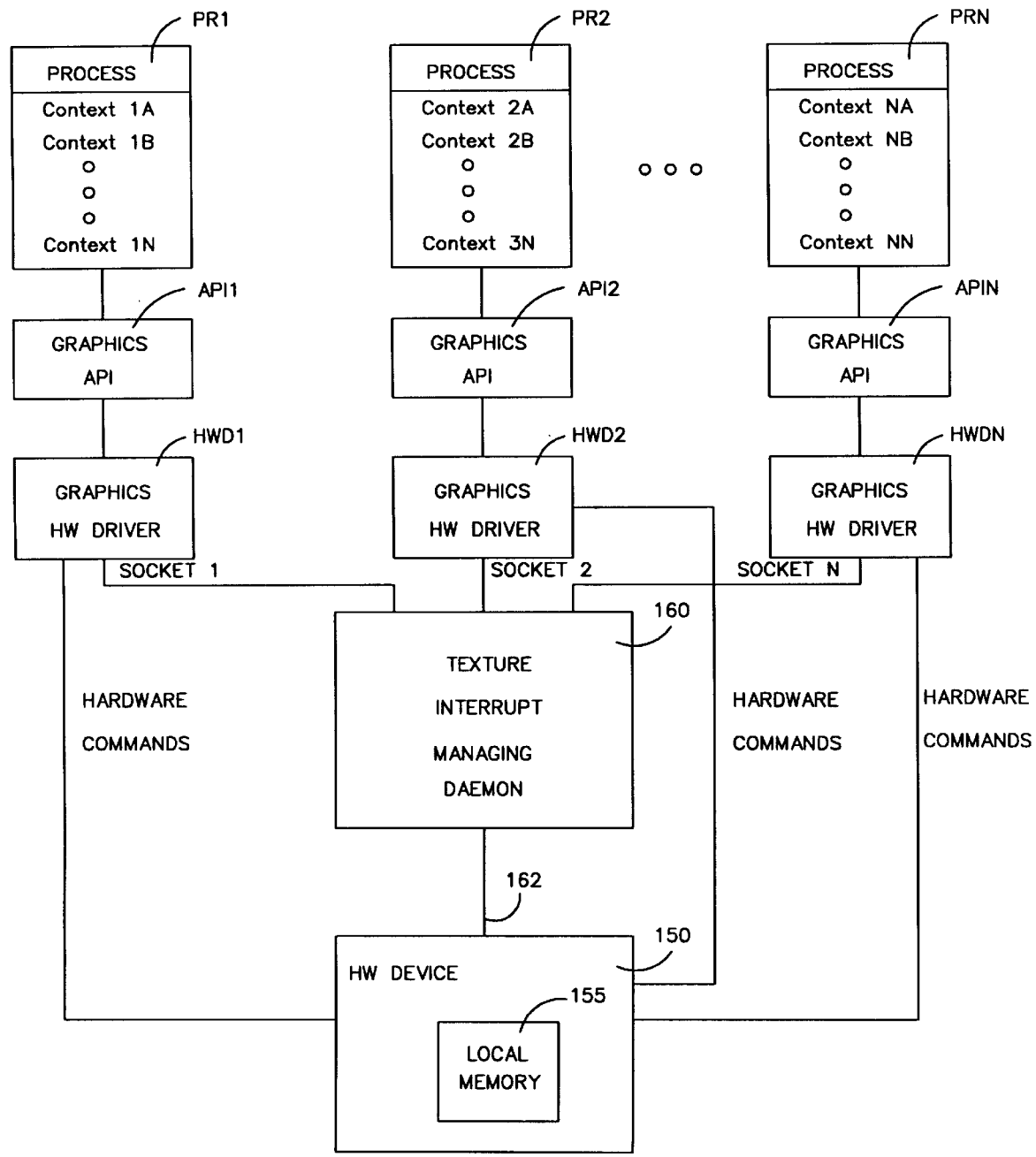
FIG. 3 is a part hardware, part software block diagram of a computer graphics system in accordance with the prior invention of Gannett.
Figure 4:
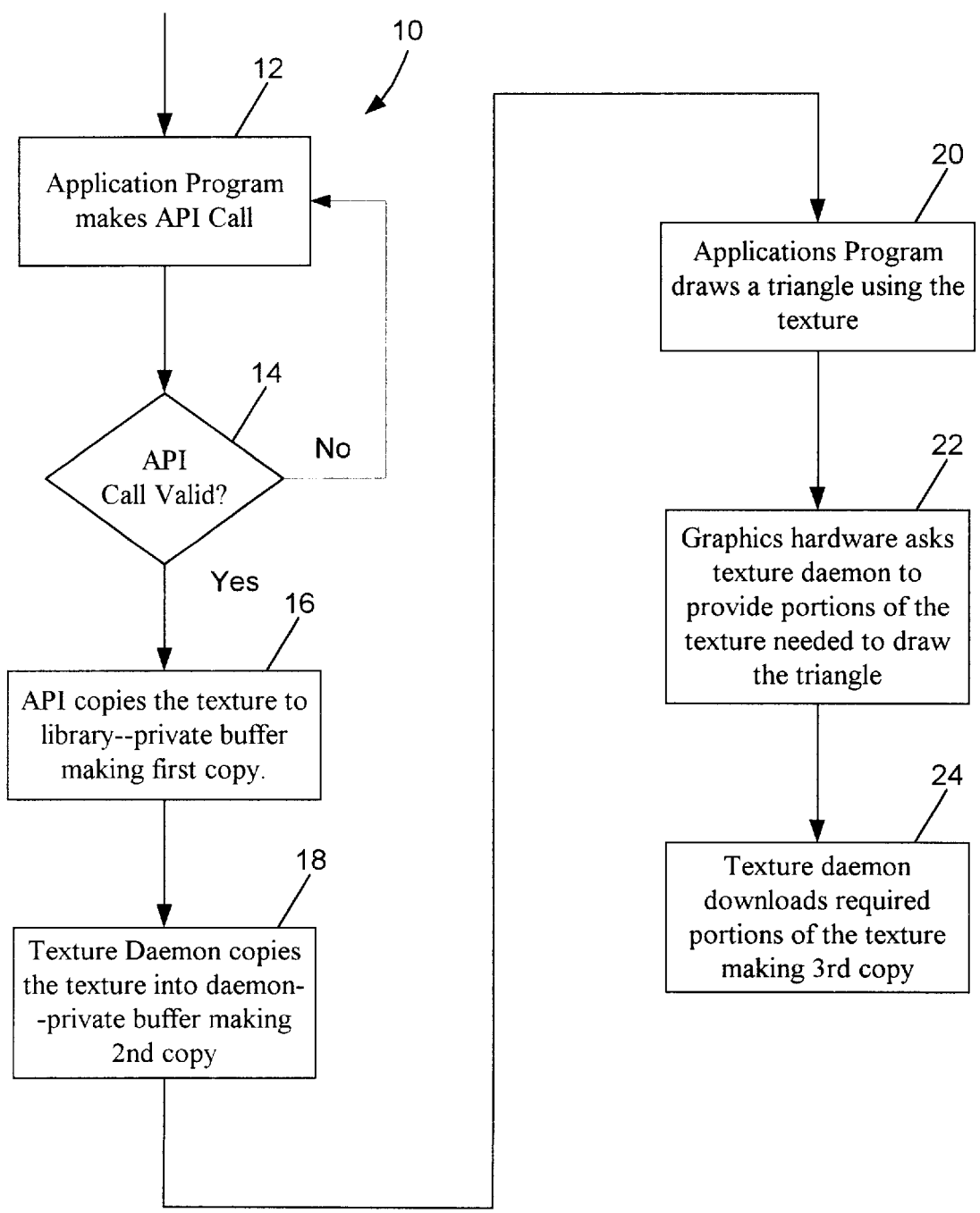
FIG. 4 is a flow chart illustrating the procedure used by in the prior invention of Gannett.
Figure 5:
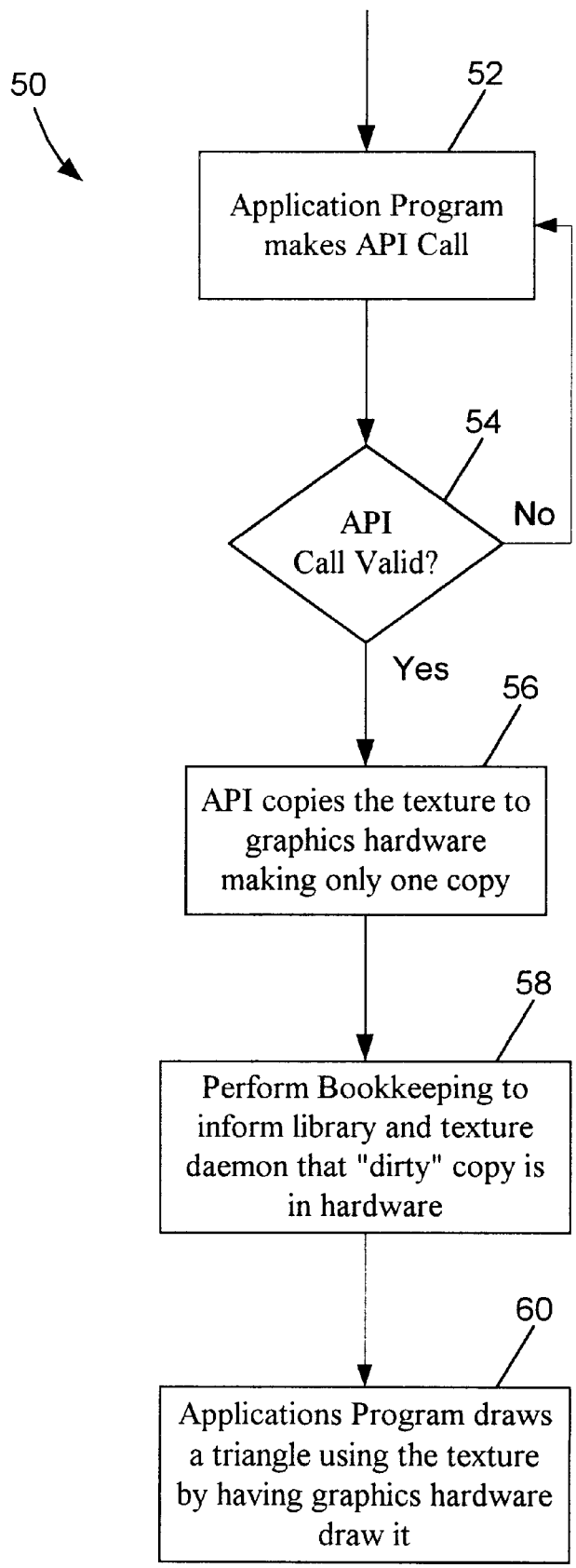
FIGS. 5 and 6 are flow charts illustrating the method of the present invention.

Referring to the flow chart of FIG. 5, in accordance with the present inventive method 50, in order to draw a textured triangle, the application program specifies a texture, using an API call 52. The API library verifies that the API call is valid 54, then it immediately downloads the texture into the graphics hardware 56. In accordance with the present invention, this graphics hardware copy of the texture will be the only copy made of the texture, unless exceptional things happen.

In accordance with the invention, bookkeeping is performed to inform both the library and the texture daemon that the only copy of the texture resides in hardware 58. This software copy is then considered "dirty", as the texture resides only in the hardware.

The application program then draws a triangle using the texture by having the graphics hardware simply draw it 60, since the graphics hardware already has a current copy of the texture.

In the situation where a texture must be retrieved from the graphics hardware, the old algorithm for retrieving the texture from the graphics hardware (either because the user inquires its value, or because the graphics hardware needs a different texture that does not fit) either the texture was copied back to the user (inquiry) or it was just overwritten in the graphics hardware (new texture needed).

Figure 6:
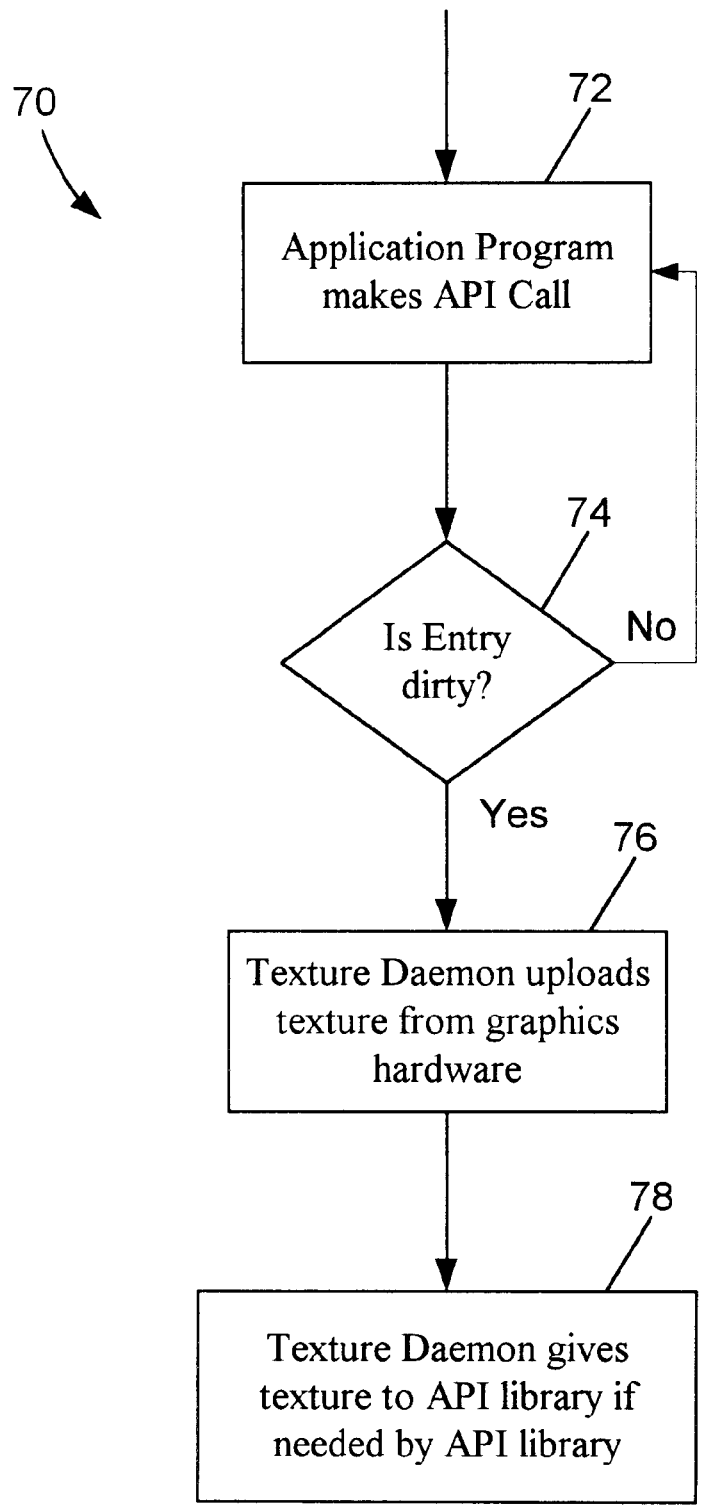

Referring now to FIG. 6, in accordance with the present invention 70, on the other hand 72, after the application program makes an API call, if the application program needs a texture, the application program first checks the bookkeeping entry to see whether the texture is "dirty" 74, i.e., whether it is in the graphics hardware already. If so, the texture daemon uploads the texture from the hardware 76. Then, if the API library needs the texture, the texture daemon gives it to the API library 78.

As will be obvious to those skilled in the computer graphics art, the use of the present inventive method will greatly increase the performance of texture mapping users, especially users that have applications with dynamically changing texture maps. Using this technique, the time and memory necessary to make a software copy of the texture map are eliminated. At worst, they are eliminated until the user exceeds the texel cache space without discarding the texture or until the texture is read back due to user inquiry or other software requirement. At best, the time and memory needed are completely eliminated.

We claim:

1. A method for fast downloading of textures in a computer graphics hardware system which employs a texture interrupt manager ("TIM") daemon, comprising the steps of:
    (a) having a graphics applications programmer interface ("API") load a texture into graphics hardware in response to a valid API call by an applications program; and
    (b) performing a bookkeeping entry by setting a flag to record the existence and validity of the texture in the graphics software, so that the graphics library software and said TIM daemon can check said bookkeeping entry to determine whether or not the texture must be retrieved from the graphics hardware, should the texture be needed.

2. The method for fast downloading of claim 1 wherein said step of having the graphics API load a texture into graphics hardware in response to a valid API call by an applications program is comprised of loading data representative of said texture into said graphics hardware.

3. The method for fast downloading of claim 2 wherein said step of performing a bookkeeping entry is comprised of setting a flag in a shared memory region, said shared memory region being accessible to both said TIM daemon and to said graphics API.

4. The method for fast downloading of claim 3 wherein said step of setting a flag comprises setting a variable to a value indicative of whether or not the texture data maintained in said graphics hardware has changed since said texture data copy maintained by said graphics API was last modified.

5. The method for fast downloading of claim 4 further comprising the step of retrieving said texture data from said graphics hardware if said flag has a value indicative of said texture data copy having been changed since said texture data copy maintained by said graphics API was last modified.

* * * * *